US011978471B2

(12) United States Patent
Ochiai et al.

(10) Patent No.: US 11,978,471 B2
(45) Date of Patent: May 7, 2024

(54) SIGNAL PROCESSING APPARATUS, LEARNING APPARATUS, SIGNAL PROCESSING METHOD, LEARNING METHOD AND PROGRAM

(71) Applicant: NIPPON TELEGRAPH AND TELEPHONE CORPORATION, Tokyo (JP)

(72) Inventors: Tsubasa Ochiai, Tokyo (JP); Marc Delcroix, Tokyo (JP); Keisuke Kinoshita, Tokyo (JP); Atsunori Ogawa, Tokyo (JP); Tomohiro Nakatani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 144 days.

(21) Appl. No.: 17/431,347

(22) PCT Filed: Feb. 12, 2020

(86) PCT No.: PCT/JP2020/005332
§ 371 (c)(1),
(2) Date: Aug. 16, 2021

(87) PCT Pub. No.: WO2020/170907
PCT Pub. Date: Aug. 27, 2020

(65) Prior Publication Data

US 2022/0076690 A1 Mar. 10, 2022

(30) Foreign Application Priority Data

Feb. 18, 2019 (JP) ................................ 2019-026853

(51) Int. Cl.
*G10L 21/0308* (2013.01)
*G10L 25/30* (2013.01)

(52) U.S. Cl.
CPC .......... *G10L 21/0308* (2013.01); *G10L 25/30* (2013.01)

(58) Field of Classification Search
CPC ............................ G10L 21/0308; G10L 25/30
See application file for complete search history.

(56) References Cited

U.S. PATENT DOCUMENTS

2012/0095761 A1* 4/2012 Nakadai .............. G10L 21/0272 704/E15.001
2019/0066713 A1* 2/2019 Mesgarani .............. G10L 25/30
(Continued)

OTHER PUBLICATIONS

Kolbæk et al. (2017) "Multi-talker Speech Separation with Utterance-level Permutation Invariant Training of Deep Recurrent Neural Networks" IEEE/ACM Transactions on Audio, Speech, and Language Processing, (TASLP) vol. 25, No. 10.
(Continued)

*Primary Examiner* — Michael N Opsasnick

(57) ABSTRACT

A signal processing device according to an embodiment of the present invention includes: a conversion unit configured to convert an input mixed acoustic signal into a plurality of first internal states, a weighting unit configured to generate a second internal state which is a weighted sum of the plurality of first internal states based on auxiliary information regarding an acoustic signal of a target sound source when the auxiliary information is input, and generate the second internal state by selecting one of the plurality of first internal states when the auxiliary information is not input, and a mask estimation unit configured to estimate a mask based on the second internal state.

20 Claims, 9 Drawing Sheets

(56) References Cited

U.S. PATENT DOCUMENTS

| | | | | |
|---|---|---|---|---|
| 2019/0139563 | A1* | 5/2019 | Chen | G06N 3/044 |
| 2022/0101869 | A1* | 3/2022 | Wichern | G10L 25/30 |

OTHER PUBLICATIONS

Delcroix et al. (2018) "Single Channel Target Speaker Extraction and Recognition with Speaker Beam" 2018 IEEE International Conference on Acoustics, Speech and Signal Processing (ICASSP), Apr. 15, 2018, pp. 5554-5558.

* cited by examiner

| | WITHOUT AUXILIARY INFORMATION | WITH AUXILIARY INFORMATION |
|---|---|---|
| MIXED SOUND SIGNAL | 0.2 | |
| PIT | 8.6 | – |
| SpeakerBeam | – | 9.6 |
| PRESENT SCHEME | 9.2 | 9.6 |

Fig. 8

SIGNAL PROCESSING APPARATUS, LEARNING APPARATUS, SIGNAL PROCESSING METHOD, LEARNING METHOD AND PROGRAM

CROSS-REFERENCE TO RELATED APPLICATIONS

This application is a U.S. 371 Application of International Patent Application No. PCT/JP2020/005332, filed on 12 Feb. 2020, which application claims priority to and the benefit of JP Application No. 2019-026853, filed on 18 Feb. 2019, the disclosures of which are hereby incorporated herein by reference in their entireties.

TECHNICAL FIELD

The present invention relates to a signal processing technology for separating an acoustic signal of each sound source or extracting an acoustic signal of a specific sound source from a mixed acoustic signal in which acoustic signals of a plurality of sound sources are mixed.

BACKGROUND ART

In recent years, speaker separation technologies for monaural sounds have actively been studied. In speaker separation technologies, two schemes are broadly known: one is blind sound source separations (Non Patent Literature 1) in which prior information is not used, and the other is target speaker separation (Non Patent Literature 2) in which auxiliary information regarding sounds of speakers is used.

CITATION LIST

Non Patent Literature

Non Patent Literature 1: Morten Kolbaek, etc., “Multitalker speech separation with utterance-level permutation invariant training of deep re-current neural networks”. Trans. on TASLP, 2017.

Non Patent Literature 2: Marc Delcroix, etc., “Single Channel Target Speaker Extraction and Recognition with Speaker Beam”, Proc. on ICASSP, 2018.

SUMMARY OF THE INVENTION

Technical Problem

In the blind sound source separation, there is the advantage in which speaker separation is possible without prior information, but there is a problem in which a permutation problem may occur between utterances. Here, the permutation problem is a problem in which the order of sound sources of separation signals may be different (exchanged) in each time section when long-time sounds which are to be processed are processed in unit time through the blind sound source separation.

In target speaker extraction, the permutation problem between utterances occurring in the blind sound source separation can be solved by tracking speakers using auxiliary information. However, when speakers included in mixed sounds are not known in advance, there is a problem in which the scheme cannot be applied.

As described above, because the blind sound source separation and the target speaker extraction have the advantages and the problems, it is necessary to use the blind sound source separation and the target speaker extraction appropriately in accordance with a situation. However, the blind sound source separation and the target speaker extraction have been constructed so far as independent systems through model training in accordance with each purpose. Therefore, blind sound source separation and the target speaker extraction cannot be appropriately used with one model.

In view of the foregoing problems, an objective of the present invention is to provide a scheme for handling blind sound source separation and target speaker extraction in an integrated manner.

Means for Solving the Problem

A signal processing device according to an aspect of the present invention includes: a conversion unit configured to convert an input mixed acoustic signal into a plurality of first internal states; a weighting unit configured to generate a second internal state which is a weighted sum of the plurality of first internal states based on auxiliary information regarding an acoustic signal of a target sound source when the auxiliary information is input, and generate the second internal state by selecting one of the plurality of first internal states when the auxiliary information is not input; and a mask estimation unit configured to estimate a mask based on the second internal state.

A learning device according to another aspect of the present invention includes: a conversion unit configured to convert an input training mixed acoustic signal into a plurality of first internal states using a neural network: a weighting unit configured to generate a second internal state which is a weighted sum of the plurality of first internal states using the neural network when auxiliary information regarding an acoustic signal of a target sound source is input, and generate the second internal state by selecting one of the plurality of first internal states when the auxiliary information is not input; a mask estimation unit configured to estimate a mask based on the second internal state using the neural network: and a parameter updating unit configured to update a parameter of the neural network used for each of the conversion unit, the weighting unit, and the mask estimation unit based on a comparison result between an acoustic signal obtained by applying the estimated mask to the training mixed acoustic signal and a correct acoustic signal of a sound source included in the training mixed acoustic signal.

A signal processing method according to yet another aspect of the present invention is performed by a signal processing device. The method includes: converting an input mixed acoustic signal into a plurality of first internal states: generating a second internal state which is a weighted sum of the plurality of first internal states when auxiliary information regarding an acoustic signal of a target sound source is input, and generating the second internal state by selecting one of the plurality of first internal states when the auxiliary information is not input; and estimating a mask based on the second internal state.

A learning method according to yet another aspect of the present invention is performed by a learning device. The method includes: converting an input training mixed acoustic signal into a plurality of first internal states using a neural network; generating a second internal state which is a weighted sum of the plurality of first internal states using the neural network when auxiliary information regarding an acoustic signal of a target sound source is input, and generating the second internal state by selecting one of the plurality of first internal states when the auxiliary information is not input; estimating a mask based on the second internal state using the neural network; and updating a parameter of the neural network used for each of the converting step, the generating step, and the estimating step based on a comparison result between an acoustic signal obtained by applying the estimated mask and a correct acoustic signal of a sound source included in the training mixed acoustic signal.

A program according to yet another aspect of the present invention causes a computer to function as the foregoing device.

Effects of the Invention

According to the present invention, it is possible to handle blind sound source separation and target speaker extraction in an integrated manner.

BRIEF DESCRIPTION OF DRAWINGS

FIG. 8 is a diagram illustrating an evaluation result according to the embodiment of the present invention.

DESCRIPTION OF EMBODIMENTS

Hereinafter, embodiments of the present invention will be described with reference to the drawings.

Figure 1:
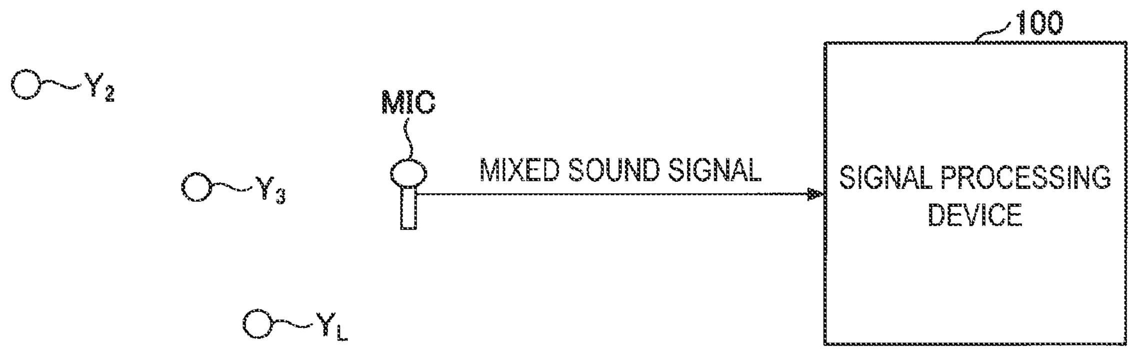
FIG. 1 is a diagram illustrating a system configuration example according to an embodiment of the present invention.

FIG. 1 is a diagram illustrating a system configuration example according to an embodiment of the present invention. In FIG. 1, a microphone MIC collects an acoustic signal (a sound or the like) from a plurality of sound sources (hereinafter at least some of the sound sources are also referred to as speakers) $Y_1$ to $Y_L$. The microphone MIC outputs the collected sound as a mixed sound signal Y to a signal processing device 100. Hereinafter, a signal called a "sound" is not limited to a voice of a human being and includes an acoustic signal given by a specific sound source. That is, a mixed sound signal may be a mixed acoustic signal in which acoustic signals from a plurality of source sources are mixed together. The signal processing device 100 according to the embodiment is not limited to the signal processing device 100 to which sounds collected by microphones are directly input and may be the signal processing device 100 that reads sound signals collected by microphones or the like and stored in, for example, a medium, a hard disk, or the like for execution.

The signal processing device 100 is a device that can receive the mixed sound signal Y as an input and separate a signal of a specific sound source without prior information (blind sound source separation), and can extract a signal of a specific sound source (target speaker extraction) using auxiliary information regarding a sound of a speaker who is a target (hereinafter referred to as a target speaker). As described above, the target speaker is not limited to a human being as long as it is a targeted sound source. Therefore, the auxiliary information means auxiliary information regarding an acoustic signal given by a targeted sound source. The signal processing device 100 uses a mask to separate or extract a signal of a specific sound source. The signal processing device 100 uses a neural network such as bi-directional long short-term memory (BLSTM) to estimate a mask.

Here, the blind sound source separation in Non Patent Literature 1 will be described giving an example of a case in which the number of sound sources is two.

Figure 2:
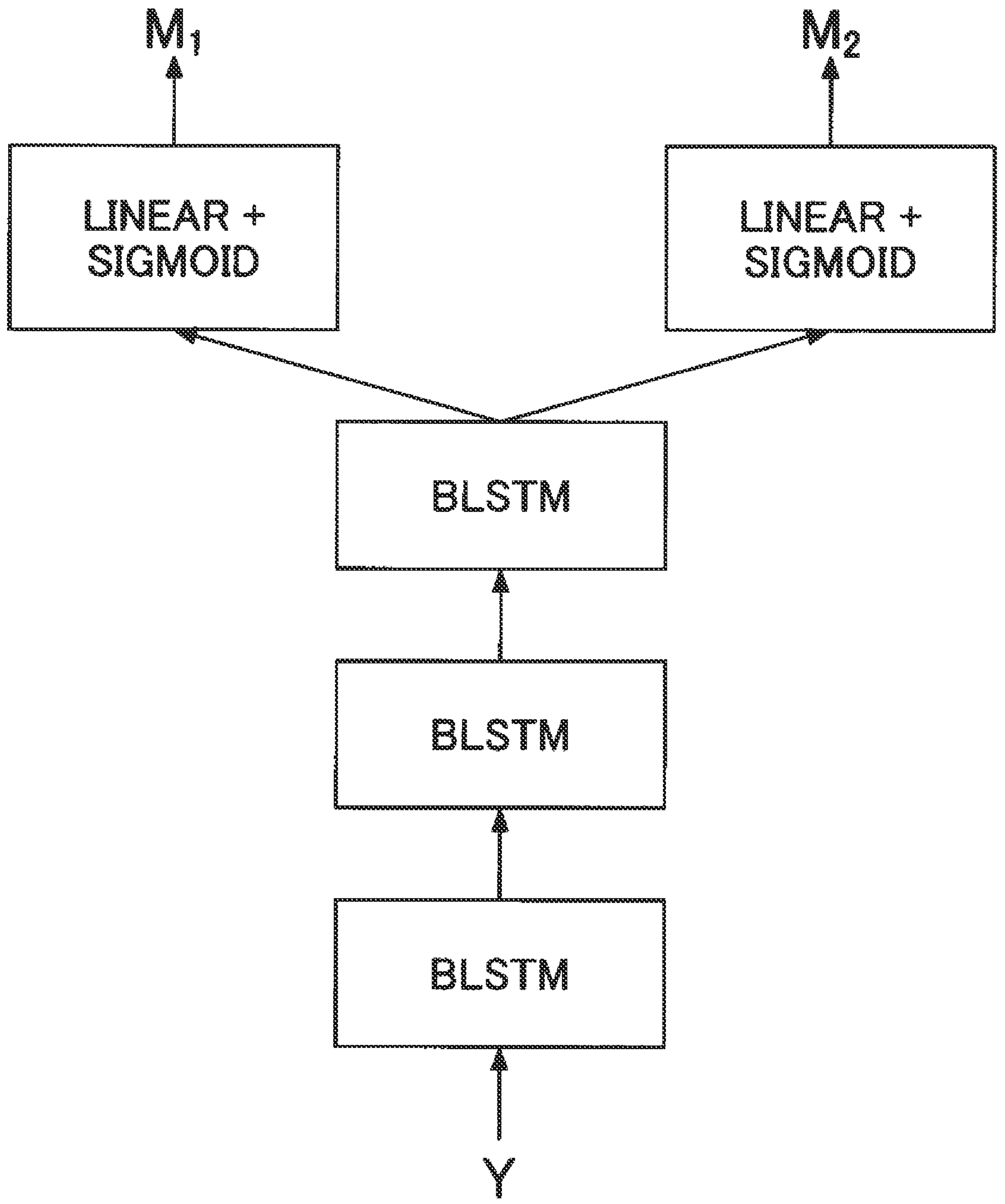
FIG. 2 is a diagram illustrating a configuration of a neural network performing blind sound source separation of the related art.

FIG. 2 is a diagram illustrating a configuration of a neural network performing the blind sound source separation of the related art of Non Patent Literature 1. In the blind sound source separation of the related art, masks $M_1$ and $M_2$ corresponding to the sound sources are obtained by converting the input mixed sound signal Y into internal states by a plurality of BLSTM layers and performing linear conversion on the internal states using linear conversion layers (LINEAR+SIGMOID) prepared by the number of sound sources (here, two) included in the mixed sound signal finally. In the linear conversion layers, output information is determined by applying a sigmoid function after the linear conversion of the internal states.

Next, a principle of the signal processing device 100 according to an embodiment of the present invention will be described.

Figure 3:
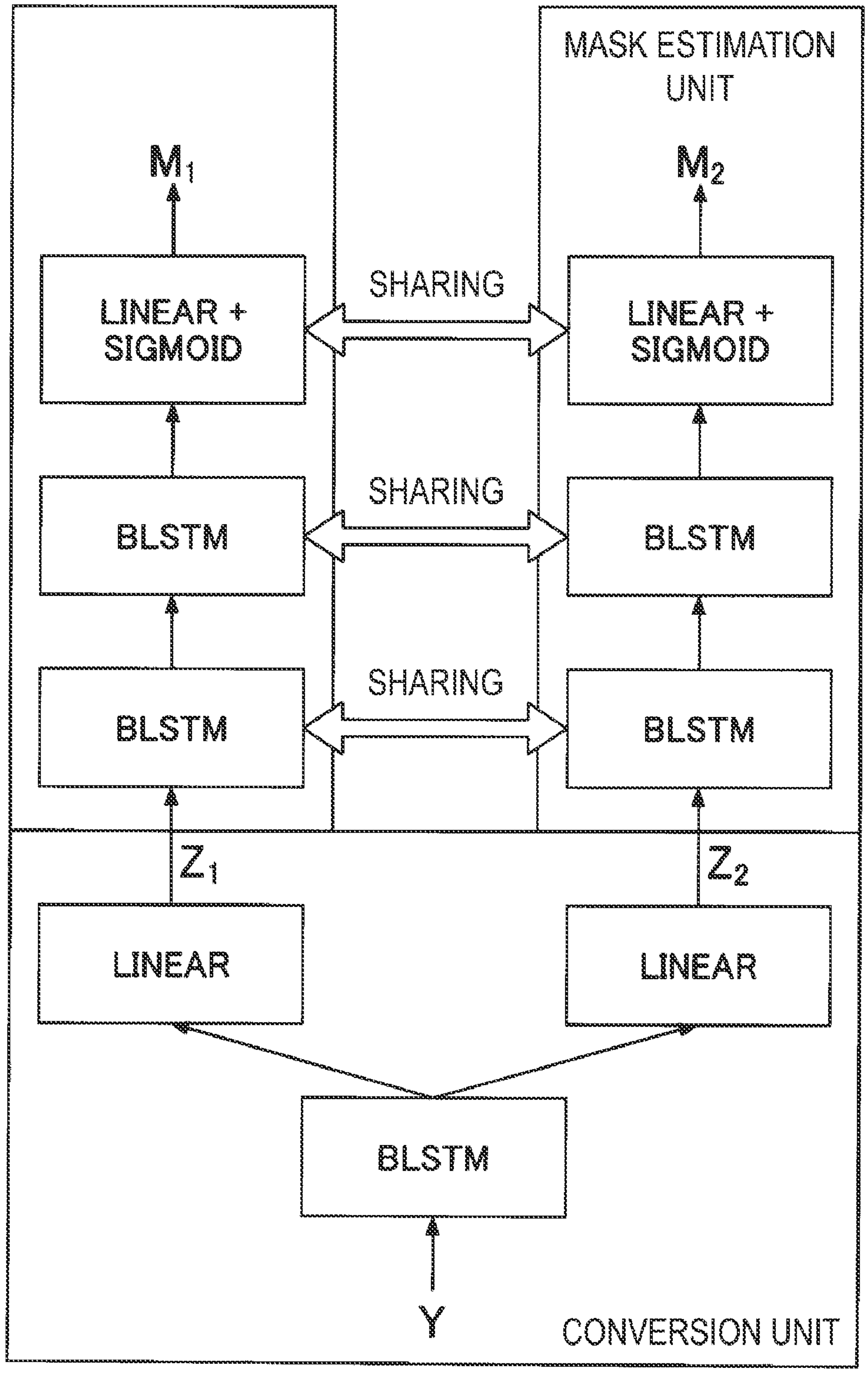
FIG. 3 is a diagram (part 1) illustrating a principle of a signal processing device according to an embodiment of the present invention.
Figure 4:
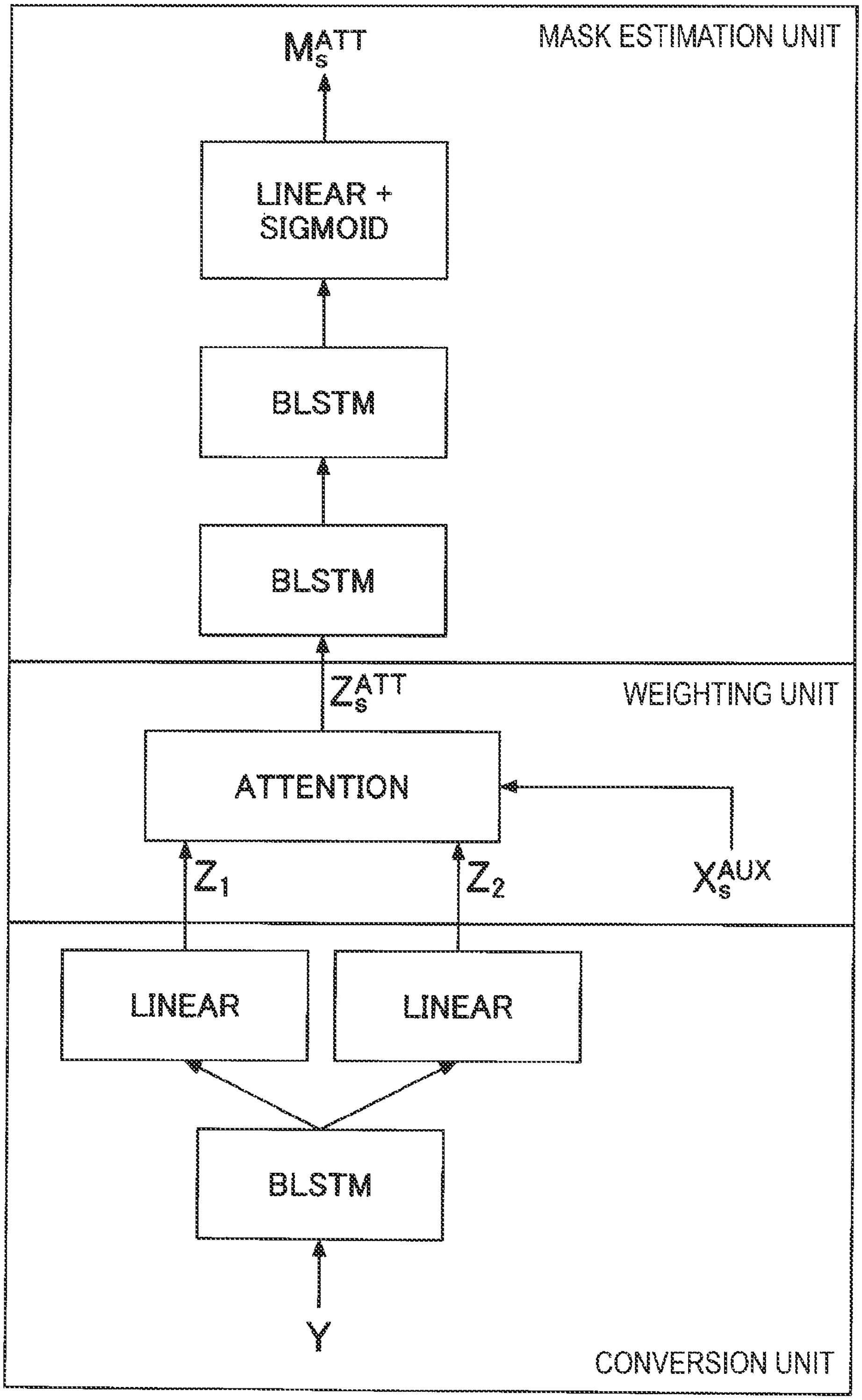
FIG. 4 is a diagram (part 2) illustrating the principle of a signal processing device according to the embodiment of the present invention.

FIGS. 3 and 4 are diagrams illustrating the principle of the signal processing device 100 according to an embodiment of the present invention.

To handle the blind sound source separation and the target speaker extraction in an integrated manner, it is necessary to incorporate a function of the target speaker extraction into a framework of the blind sound source separation. Therefore, it is conceivable that the linear conversion layer performing separation and linear conversion for each sound source located at the rear stage of the neural network in FIG. 2 be moved to a conversion unit at the front stage of a neural network as in FIG. 3. As will be described below, the conversion unit converts the mixed sound signal Y using a neural network to convert the mixed sound signal Y into internal states $Z_1$ and $Z_2$ corresponding to the separated signals. The number of internal states is preferably equal to or greater than the maximum number of sound sources (here, two) assumed to be included in the mixed sound signal Y. At this time, the BLSTM layer and the linear conversion layer in a mask estimation unit after the linear conversion layer can be shared.

Further, as in FIG. 4, a weighting unit (ATTENTION layer) is added between the conversion unit and the mask estimation unit and is configured to convert the internal states in accordance with auxiliary information $X_s^{AUX}$ regarding a sound of a target speaker. When the auxiliary information $X_s^{AUX}$ is input, the weighting unit can cause the mask estimation unit at the rear stage to estimate a mask for target speaker extraction by obtaining an internal state corresponding to the target speaker as $Z_s^{ATT}$ from the plurality of internal states $Z_1$ and $Z_2$ based on the input auxiliary information and causing the mask estimation unit to perform an operation. When no auxiliary information is input, the weighting unit can cause the mask estimation unit at the rear stage to estimate a mask of the blind sound source separation by causing the mask estimation unit at the rear stage to perform an operation using $Z_s^{ATT}$ as $Z_1$ and similarly causing the mask estimation unit at the rear stage to perform an operation using $Z_s^{ATT}$ as $Z_2$. That is, by changing the internal states in accordance with presence or absence of the auxiliary information, it is possible to switch the blind sound source separation and the target speaker extraction for use.

As will be described below, each of the conversion unit, the weighting unit, and the mask estimation unit of the signal processing device 100 is configured using a neural network. At the time of learning, the signal processing device 100 learns parameters of the neural network using training data prepared in advance (correct sound signals from individual sound sources are assumed to be known). At the time of operation, the signal processing device 100 calculates a mask using the neural network of which the parameters learned at the time of learning are set.

The learning of the parameters of the neural network in the signal processing device 100 may be performed by a separate device or the same device. In the following embodiments, a separate device called a learning device performs the learning of the neural network in description.

Embodiment 1: Signal Processing Device

In Embodiment 1, the signal processing device 100 that handles the blind sound source separation and the target speaker extraction in an integrated manner in accordance with presence or absence of auxiliary information regarding sounds of speakers will be described.

Figure 5:
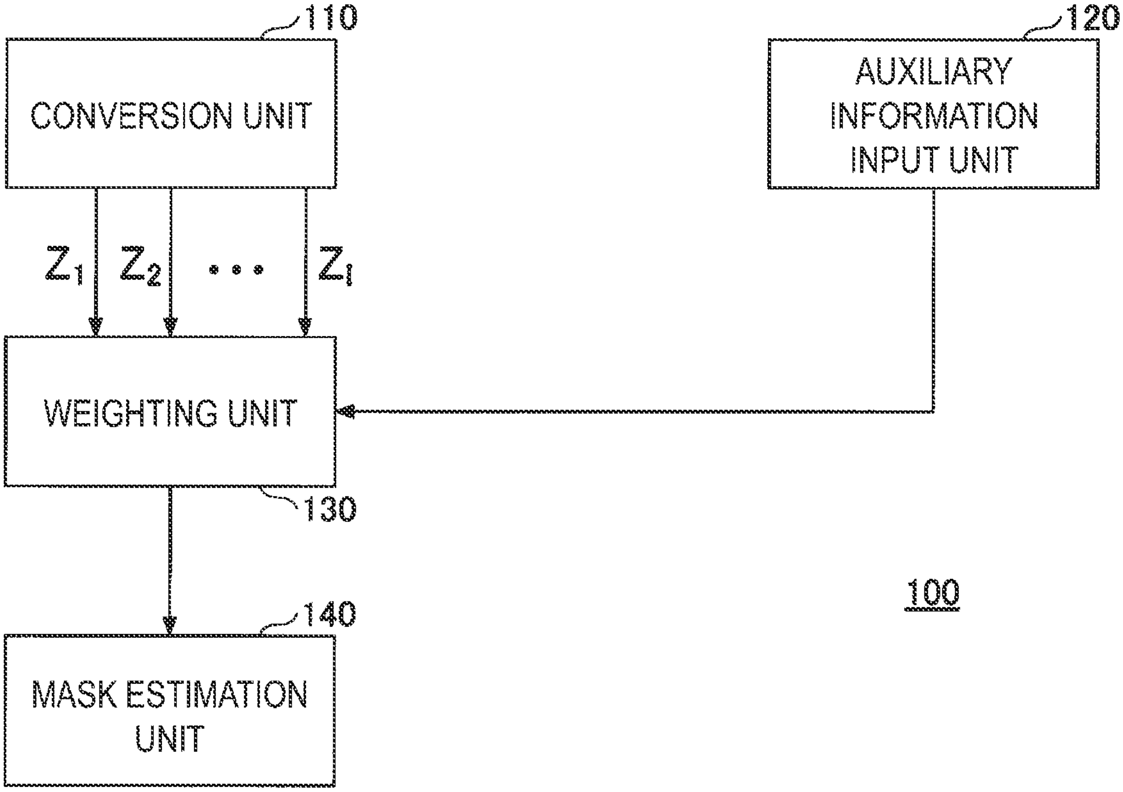
FIG. 5 is a diagram illustrating a configuration of a signal processing device according to the embodiment of the present invention.

FIG. 5 is a diagram illustrating a configuration of the signal processing device 100 according to the embodiment of the present invention. The signal processing device 100 includes a conversion unit 110, an auxiliary information input unit 120, a weighting unit 130, and a mask estimation unit 140. The conversion unit 110, the weighting unit 130, and the mask estimation unit 140 correspond to layers (a plurality of layers) of a neural network, respectively. Each parameter of the neural network is assumed to be trained in advance by a learning device to be described below using training data prepared in advance. Specifically, the parameter is assumed to have been learned so that an error is small between a sound signal obtained by applying a mask estimated by the mask estimation unit 140 to the learning data and a correct sound signal included in the learning data.

Conversion Unit

The conversion unit 110 is a neural network that accepts a mixed sound signal as an input and outputs vectors $Z_1$ to $Z_I$ indicating I internal states. Here, I is preferably set to be equal to or greater than the number of sound sources included in input mixed sounds. A type of neural network is not particularly limited. For example, BLSTM disclosed in Non Patent Literatures 1 and 2 may be used. In the following description, BLSTM will be exemplified in description.

Figure 6:
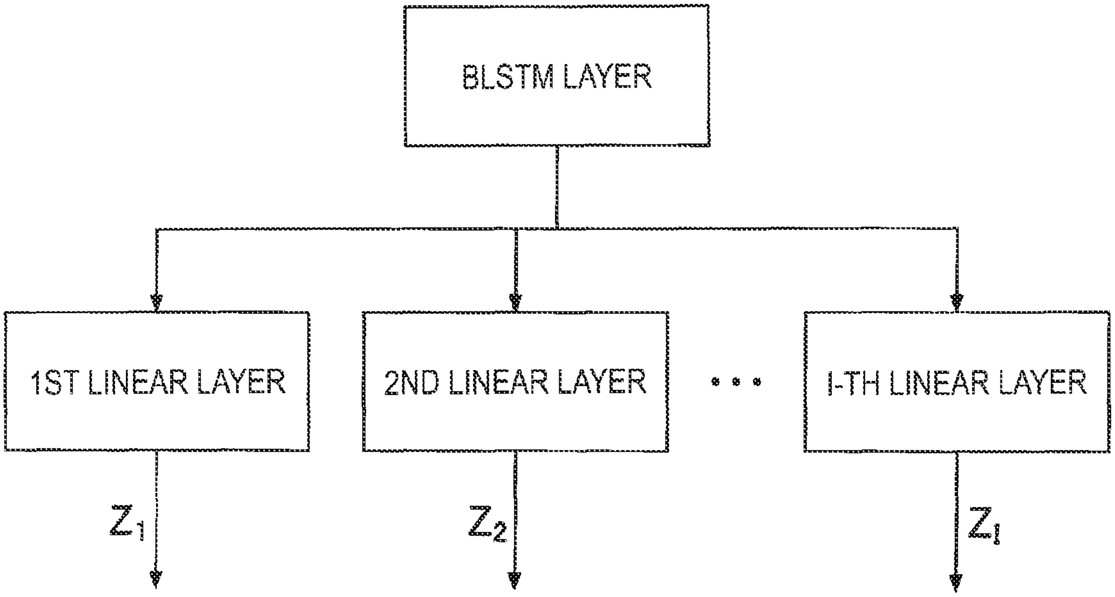
FIG. 6 is a diagram illustrating a configuration of a conversion unit of a signal processing device.

Specifically, the conversion unit 110 is configured by layers illustrated in FIG. 6. First, the conversion unit 110 converts the input mixed sound signal into the internal states Z in the BLSTM layers. Subsequently, the conversion unit 110 performs different linear conversion on the internal states Z in I linear conversion layers (first to I-th LINEAR layers) to obtain embedding vectors $Z_1$ to $Z_I$ which are I internal states. Here, supposing that t (where t=1, . . . , T) is an index of a time frame of a processing target, the embedding vectors $Z_1$ to $Z_I$ can be expressed as in $Z_i=\{z_{it}\}_{y=1}^{T}$ (where i=1, . . . , I).

Auxiliary Information Input Unit

When the target speaker extraction is performed, the auxiliary information input unit 120 is an input unit that accepts auxiliary information $X_s^{AUX}$ regarding a sound of a target speaker and outputs the auxiliary information $X_s^{AUX}$ to the weighting unit 130.

When the target speaker extraction is performed, the auxiliary information $X_s^{AUX}$ indicating a feature of the sound of the target speaker is input to the auxiliary information input unit 120. Here, s is an index indicating the target speaker. For example, as the auxiliary information $X_s^{AUX}$, for example, speaker vectors or the like obtained by converting a vector $A^{(s)}(t, f)$ obtained by performing feature extraction on the sound signals of the target speaker through short-time Fourier transform (STFT) disclosed in Non Patent Literature 2 may be used. When the target speaker extraction is not performed (that is, when the blind sound source separation is performed), nothing is input to the auxiliary information input unit 120.

Weighting Unit

The weighting unit 130 is a processing unit that accepts the internal states $Z_1$ to $Z_I$ output from the conversion unit 110 as inputs, accepts the auxiliary information $X_s^{AUX}$ output from the auxiliary information input unit 120 as an input when the target speaker extraction is performed, and outputs an internal state $Z_s^{ATT}=\{z_t^{ATT}\}_{t-1}^{T}$ for mask estimation. As described above, t (where t=1, . . . , T) is an index of a time frame of a processing target.

The weighting unit 130 obtains and outputs the internal state $z_t^{ATT}$ by weighting the input 1 internal states $Z_1$ to $Z_I$ in accordance with presence or absence of the auxiliary information $X_s^{AUX}$. For example, when I=2, an attention weight $a_t$ is set as follows in accordance with presence or absence of the auxiliary information.

[Math 1]

$$a_t = \begin{cases} [1, 0] \text{ or } [0, 1] & \text{(WITHOUT AUXILIARY INFORMATION)} \\ MLP\text{Attention}(Z_i, X_s^{AUX}) & \text{(WITH AUXILIARY INFORMATION)} \end{cases}$$

Here, MLP Attention is a neural network for obtaining an I-dimensional weight vector based on the internal state $Z_i$ and the auxiliary information $X_s^{AUX}$. A type of neural network is not particularly limited. For example, multiplayer perceptron (MLP) may be used.

Next, the weighting unit 130 obtains the internal state $z_t^{ATT}$ as follows.

$$z_t^{ATT} = \underbrace{\sum_{i=1}^{I} a_{ti} z_{it}}_{Attention}, \quad (t = 1, \ldots , T) \qquad \text{[Math. 2]}$$

That is, the attention weight at is an I-dimensional vector and the attention weight at is a unit vector in which only an i-th (where i=1, 2, 3, . . . , I) element is 1 and the other elements are 0 when no auxiliary information is input. The weighting unit 130 selects an i-th internal state $Z_i$ by applying the attention weight at to the I internal states $Z_1$ to $Z_I$ and outputs the i-th internal state $Z_i$ as the internal state $z_t^{ATT}$. By setting each of the I unit vectors as the attention weight at, it is possible to estimate masks for separating sounds of all the speakers included in a mixed sound in a blind form. In other words, when no auxiliary information is input, the weighting unit 130 performs calculation (hard alignment) to select one of the I internal states $Z_i$ to $Z^I$.

When the auxiliary information is input, the attention weight at estimated based on the internal state $Z_i$ and the auxiliary information $X_s^{AUX}$ is used. The weighting unit 130 calculates an internal state corresponding to a target speaker s from the I internal states $Z_i$ to Z, by applying the attention weight at to the I internal states $Z_1$ to $Z_I$, and outputs the internal state as $z_t^{ATT}$. In other words, when the auxiliary information is input, the weighting unit 130 obtains the internal state as $z_t^{ATT}$ by weighted sum (soft alignment) of the I internal states $Z_1$ to $Z_I$ based on the auxiliary information $X_s^{AUX}$ and outputs the internal state.

A weight to be multiplied to each internal state in the weighting unit 130 differs for each time. That is, the weighting unit 130 performs calculation (hard alignment or soft alignment) of a weighted sum for each time.

In the estimation of the attention weight, for example, MLP attention disclosed in Dzmitrv Bahdanau, etc., "Neural machine translation by jointly learning to align and translate", Proc on ICLR, 2015 can be used. Here, as a configuration of the MLP attention, a key is set to Feature (Zi), a query is set to Feature ($X_s^{AUX}$), and a value is set to Zi. Feature (•) indicates MLP performing feature extraction from an input sequence.

Mask Estimation Unit

The mask estimation unit 140 is a neural network that accepts an internal state $Z^{ATT}$ (time-series information in which the internal state as $z_t^{ATT}$ of each time is arranged) output from the weighting unit 130 as an input and output a mask. A type of neural network is not particularly limited. For example, BLSTM disclosed in Non Patent Literatures 1 and 2 may be used.

The mask estimation unit 140 is configured by, for example, BLSTM and all bonding layers, and converts the internal state $Z^{ATT}$ into a time frequency mask $M_{ATT}$ and outputs the time frequency mask.

Embodiment 2: Learning Device

In Embodiment 2, the learning device 200 that learns parameters of the neural network included in the signal processing device 100 according to Embodiment 1 will be described.

Figure 7:
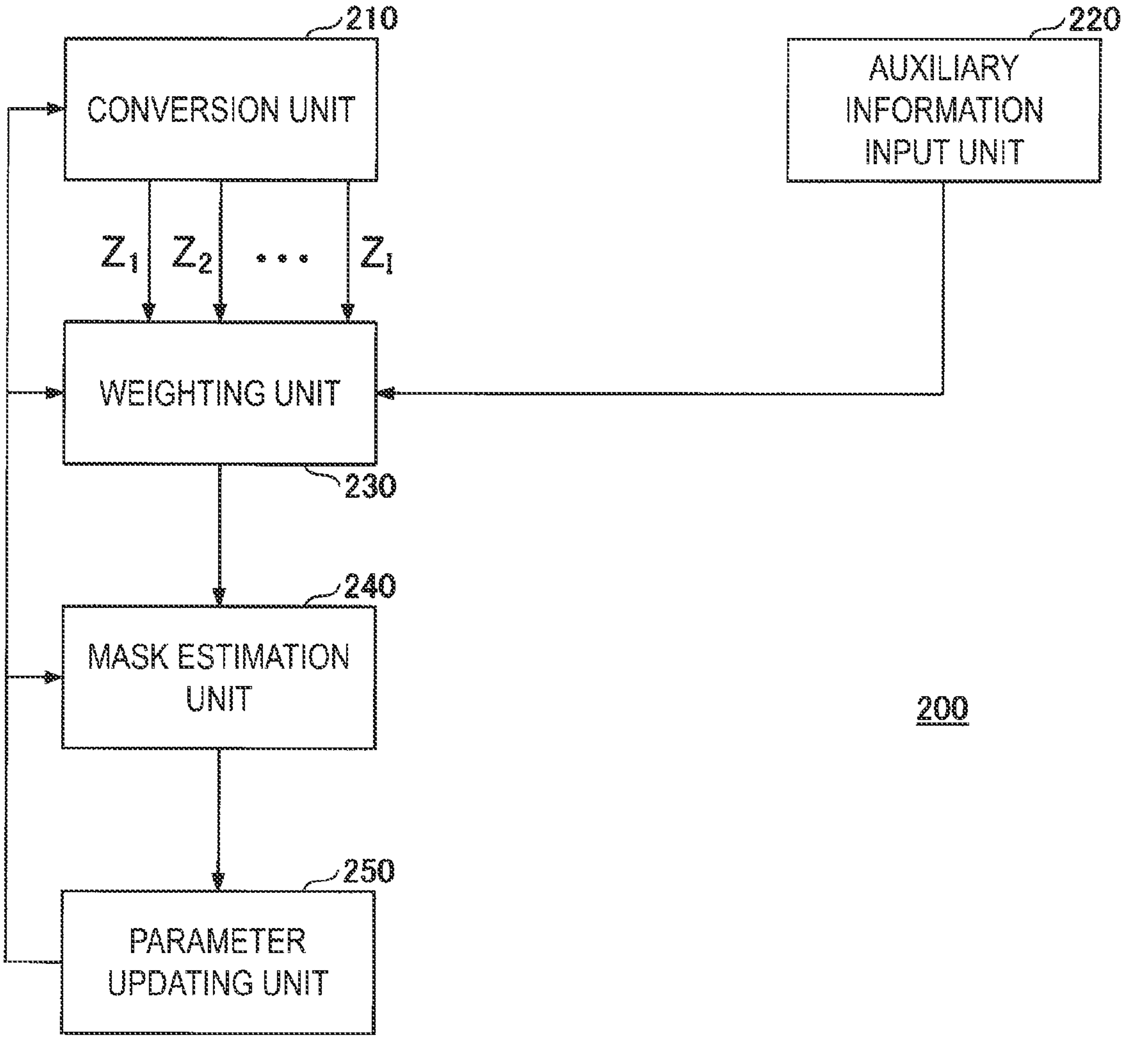
FIG. 7 is a diagram illustrating a configuration of a learning device according to an embodiment of the present invention.

FIG. 7 is a diagram illustrating a configuration of the learning device 200 according to the embodiment of the present invention. The learning device 200 includes a conversion unit 210, an auxiliary information input unit 220, a weighting unit 230, a mask estimation unit 240, and a parameter updating unit 250. Functions of the conversion unit 210, the auxiliary information input unit 220, the weighting unit 230, and the mask estimation unit 240 are the same as those of Embodiment 1.

As training data for leaning parameters of the neural network, a set is assumed to be given in which a mixed sound signal, a clean signal (that is, a correct sound signal) of each sound source included in the mixed sound signal, and auxiliary information (the existence of the auxiliary information depends on cases) regarding a sound of a target speaker are associated with each other.

The conversion unit 210, the weighting unit 230, and the mask estimation unit 240 accepting the mixed sound signal and the auxiliary information in the training data as an input can perform the similar processes as those of Embodiment 1 and obtain estimated values of the masks. Here, an appropriate initial value is assumed to be set in each parameter of the neural network.

Parameter Updating Unit

The parameter updating unit 250 is a processing unit that accepts the training data and the masks output from the mask estimation unit 240 as an input and outputs each parameter of the neural network.

The parameter updating unit 250 updates each parameter of the neural network in the conversion unit 210, the weighting unit 230, and the mask estimation unit 240 through an error back propagation method or the like based on a comparison result between the clean signal in the training data and the sound signal obtained by applying the masks estimated by the mask estimation unit 240 to the input mixed sound signal in the training data.

To update each parameter of the neural network, the parameter updating unit 250 performs multi-task learning in consideration of losses of both the blind sound source separation in which no auxiliary information is used and the target speaker extraction in which the auxiliary information is used. For example, $L_{uinfo}$ is a loss function for the blind sound source separation in which no auxiliary information is used, $L_{info}$ is a loss function for the target speaker separation in which the auxiliary information is used, and a loss function $L_{multi}$ based on multi-task learning is defined as follows using F as a predetermined interpolation coefficient (of which a value is assumed to be set in advance). Based on these, the parameter updating unit 250 performs error back propagation learning.

$$L_{multi}=\varepsilon L_{uinfo}+(1-\varepsilon)L_{info}$$

The parameter updating unit 250 repeats the estimation of the masks and the updating of the parameters until a predetermined condition such as a convergence condition that an error is less than a threshold is satisfied, and uses the finally obtained parameters as learned neural network parameters.

Effects of Embodiments of the Present Invention

The signal processing device 100 according to the embodiments of the present invention first separates an input mixed sound signal into a plurality of internal states, subsequently performs either selection of one of the plurality of internal states or generation of an internal state which is a weighted sum of the plurality of internal states in accordance with presence or absence of the auxiliary information, and subsequently converts the selected or generated internal state to estimate the masks. Therefore, the blind sound source separation and the target speaker extraction can be switched and performed using a model of one neural network.

The learning device 200 according to the embodiments of the present invention performs multi-task learning in consideration of losses of both the blind sound source separation and the target speaker extraction. Therefore, it is possible to learn the signal processing device with good separation performance than in individual learning.

To evaluate the performance of the signal processing device 100 according to the embodiments of the present invention, performance evaluation of permutation invariant training (PIT) which is the blind sound source separation method, SpeakerBeam which is the target speaker extraction scheme, and the embodiment (the present scheme) of the present invention has been performed using an experiment data set. The neural network structure based on BLSTM of three layers has been used for all the three schemes. FIG. 8 is a diagram illustrating an evaluation result of the embodiment of the present invention. An unprocessed mixed sound signal and signal-to-distortion ratios (SDR) (dB unit) of three schemes are illustrated. From FIG. 8, it can be understood that, when no auxiliary information is used, better separation performance is exerted because of the effect of the multi-task learning in the embodiment of the present invention than in PIT. Even when the auxiliary information is used, it can be understood that the same separation performance as that of SpeakerBeam specialized and designed for the purpose is exerted.

Hardware Configuration Example

Figure 9:
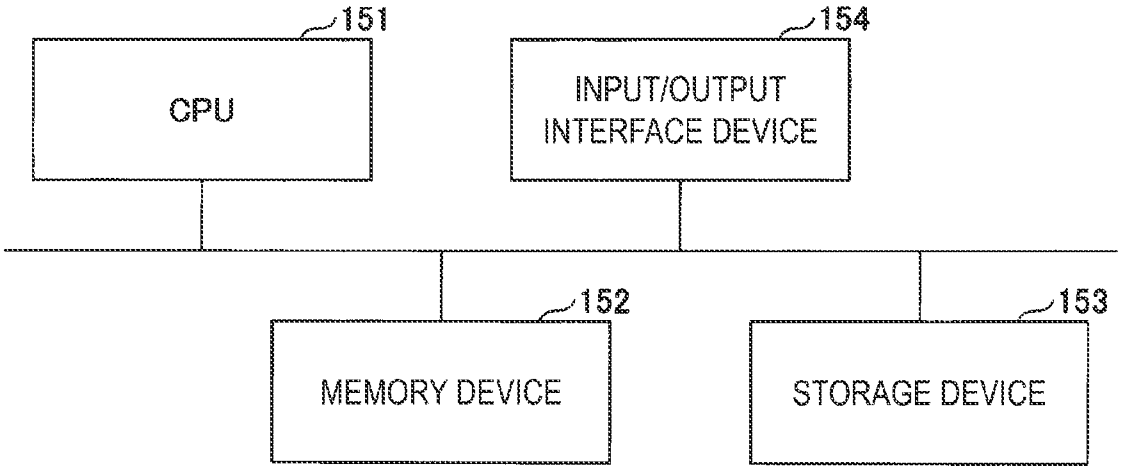
FIG. 9 is a diagram illustrating a hardware configuration example of each device according to the embodiment of the present invention.

FIG. 9 is a diagram illustrating a hardware configuration example of each device (the signal processing device 100 and the learning device 200) according to the embodiments of the present invention. Each device may be a computer that includes a processor such as a central processing unit (CPU) 151, a memory device 152 such as a random access memory (RAM) or a read-only memory (ROM), and a storage device 153 such as a hard disk. For example, a function and a process of each device are realized by allowing the CPU 151 to execute a program or data stored in the storage device 153 or the memory device 152. Information necessary for each device may be input from an input/output interface device 154 and a result obtained in each device may be output from the input/output interface device 154.

Supplement

For facilitating description, the signal processing device and the learning device according to the embodiments of the present invention have been described with reference to a functional block diagram, but the signal processing device and the learning device according to the embodiments of the present invention may be realized by hardware, software, or a combination thereof. For example, the embodiments of the present invention may be realized by a program causing a computer to realize the functions of the signal processing device and the learning device according to the embodiments of the present invention, a program causing a computer to perform each procedure of a method related to the embodiments of the present invention, or the like. The functional units may be used in combination as necessary. The method according to the embodiment of the present invention may be performed in a different order from the order described in the embodiment.

The scheme of handing the blind sound source separation and the target speaker extraction in an integrated manner has been described above, but the present invention is not limited to the foregoing embodiments and can be changed and applied in various forms within the scope of the claims.

REFERENCE SIGNS LIST

100 Signal processing device
110 Conversion unit
120 Auxiliary information input unit
130 Weighting unit
140 Mask estimation unit
200 Learning device
210 Conversion unit
220 Auxiliary information input unit
230 Weighting unit
240 Mask estimation unit
250 Parameter updating unit

The invention claimed is:

1. A signal processing device comprising a processor configured to execute operations comprising:

converting an input mixed acoustic signal into a plurality of first internal states of using the input mixed acoustic signal to generate separate acoustic signals according to sound sources;

generating a second internal state independent of the presence of auxiliary information, wherein:

when there is the auxiliary information, the generating further comprises:

receiving the auxiliary information, wherein the auxiliary information includes a feature value of a target sound source, and determining the second internal state according to a weighted sum of the plurality of first internal states, and, when the auxiliary information is not input, the generating further comprises determining the second internal state by selecting one of the plurality of first internal states; and estimating a mask based on the second internal state.

2. The signal processing device according to claim 1, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

3. The signal processing device according to claim 1, wherein the first internal states and the second internal states represent internal states of a neural network, and the neural network has been trained so that an error is within a predetermined threshold, and the error is between an acoustic signal obtained by applying the estimated mask to a mixed acoustic signal and a correct acoustic signal of a sound source included in the mixed acoustic signal.

4. The signal processing device according to claim 3, wherein converting further comprises converting the input mixed acoustic signal into I first internal states, and generating further comprises generating the second internal state by applying an I-dimensional weight vector estimated based on the I first internal states and the auxiliary information to the I first internal states when the auxiliary information is input, and generates the second internal state by applying an I-dimensional unit vector in which an i-th (where i=1, . . . , I) element is 1 and other elements are 0 to the I first internal states when the auxiliary information is not input.

5. A learning device for signal processing, the learning device comprising a processor configured to execute operations comprising:

converting an input training mixed acoustic signal into a plurality of first internal states of using the input mixed acoustic signal to generate separate acoustic signals according to sound sources using a neural network;

generating a second internal state independent of the presence of auxiliary information, wherein:

when there is the auxiliary information, the generating further comprises:

receiving the auxiliary information as input, wherein the auxiliary information includes a feature value of a target sound source, and determining the second internal state according to a weighted sum of the plurality of first internal states using the neural network, and when the auxiliary information is not input, the generating further comprises determining the second internal state by selecting one of the plurality of first internal states;

estimating a mask based on the second internal state using the neural network; and updating:

a first parameter of the neural network used for converting the input training mixed acoustic signal, a second parameter of the neural network used for generating the second internal state, and a third parameter of the neural network used for estimating the mask based on a comparison result between an acoustic signal obtained by applying the estimated mask to the training mixed acoustic signal and a correct acoustic signal of a sound source included in the training mixed acoustic signal.

6. The learning device according to claim 5, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

7. The learning device according to claim 5, wherein the first internal states and the second internal states represent internal states of a neural network, and the first neural network has been trained so that an error is within a predetermined threshold, and the error is between an acoustic signal obtained by applying the estimated mask to a mixed acoustic signal and a correct acoustic signal of a sound source included in the mixed acoustic signal.

8. The learning device according to claim 7, wherein the converting further comprises converting the input mixed acoustic signal into I first internal states, and the generating further comprises generating the second internal state by applying an I-dimensional weight vector estimated based on the I first internal states and the auxiliary information to the I first internal states when the auxiliary information is input, and generates the second internal state by applying an I-dimensional unit vector in which an i-th (where i=1, . . . , I) element is 1 and other elements are 0 to the I first internal states when the auxiliary information is not input.

9. The learning device according to claim 5, wherein updating further comprise updating the parameter in consideration of both a loss when the auxiliary information is input and a loss when the auxiliary information is not input.

10. The learning device according to claim 9, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

11. The learning device according to claim 9, wherein the first internal states and the second internal states represent internal states of a neural network, and the 0 neural network has been trained so that an error is within a predetermined threshold, and the error is between an acoustic signal obtained by applying the estimated mask to a mixed acoustic signal and a correct acoustic signal of a sound source included in the mixed acoustic signal.

12. The learning device according to claim 11, wherein the converting further comprises converting the input mixed acoustic signal into I first internal states, and the generating further comprises generating the second internal state by applying an I-dimensional weight vector estimated based on the I first internal states and the auxiliary information to the I first internal states when the auxiliary information is input, and generates the second internal state by applying an I-dimensional unit vector in which an i-th (where i=1, . . . , I) element is 1 and other elements are 0 to the I first internal states when the auxiliary information is not input.

13. The learning device according to claim 5, the processor further configured to execute operations comprising:

updating:

a first parameter of the neural network used for the converting, a second parameter of the neural network used for the generating, and a third parameter of the neural network for the estimating based on a comparison result between an acoustic signal obtained by applying the estimated mask to the training mixed acoustic signal and the correct acoustic signal of the sound source included in the training mixed acoustic signal.

14. The learning device according to claim 13, wherein the converting uses a first neural network, the generating uses a second neural network, the estimating uses a third neural network, and the first neural network has been trained so that an error is within a predetermined threshold, and the error is between an acoustic signal obtained by applying the estimated mask to a mixed acoustic signal and a correct acoustic signal of a sound source included in the mixed acoustic signal.

15. The learning device according to claim 13, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

16. The method according to claim 14, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

17. A method for processing signals, comprising:

converting, an input mixed acoustic signal into a plurality of first internal states of using the input mixed acoustic signal to generate separate acoustic signals according to sound sources;

generating a second internal state independent of the presence of auxiliary information, wherein:

when there is auxiliary information, the generating further comprises:

receiving the auxiliary information, wherein the auxiliary information includes a feature value of a target sound source, and determining the second internal state according to a weighted sum of the plurality of first internal states;

when the auxiliary information is not input, the generating further comprises determining the second internal state by selecting one of the plurality of first internal states; and estimating a mask based on the second internal state.

18. The method according to claim 17, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

19. The method according to claim 17, wherein the first internal states and the second internal states represent internal states of a neural network, and the neural network has been trained so that an error is within a predetermined threshold, and the error is between an acoustic signal obtained by applying the estimated mask to a mixed acoustic signal and a correct acoustic signal of a sound source included in the mixed acoustic signal.

20. The method according to claim 19, wherein the converting further comprises converting the input mixed acoustic signal into I first internal states, and the generating further comprises:

generating the second internal state by applying an I-dimensional weight vector estimated based on the I first internal states and the auxiliary information to the I first internal states when the auxiliary information is input, and generating the second internal state by applying an I-dimensional unit vector in which an i-th (where i=1, . . . , I) element is 1 and other elements are 0 to the I first internal states when the auxiliary information is not input.

* * * * *